Feb. 16, 1960
J. L. HENSLEY
2,925,005
WORK HOLDER
Filed Jan. 10, 1958
2 Sheets-Sheet 1
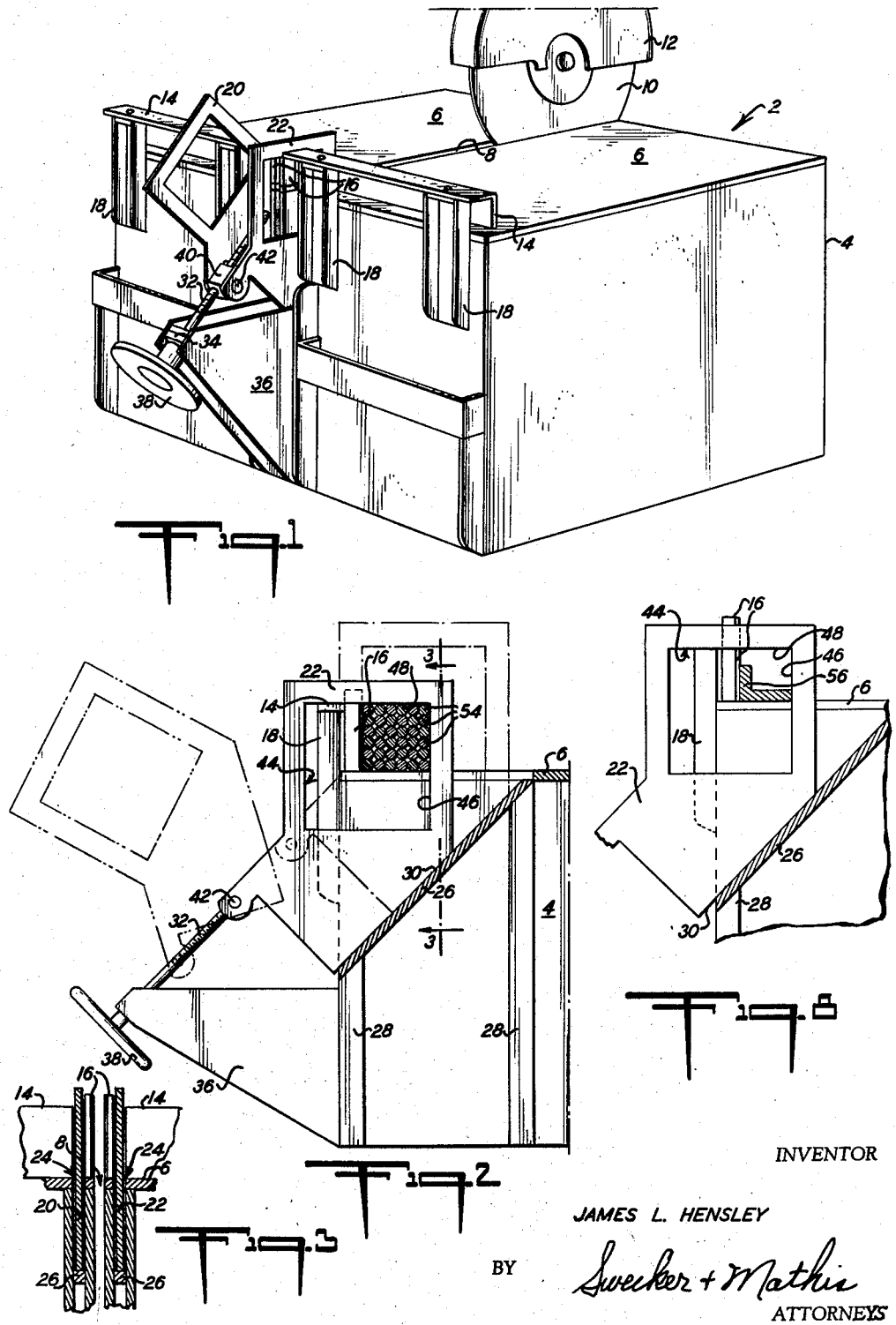
INVENTOR
JAMES L. HENSLEY
BY Sweeker + Mathis
ATTORNEYS Feb. 16, 1960 J. L. HENSLEY 2,925,005
WORK HOLDER
Filed Jan. 10, 1958 2 Sheets-Sheet 2
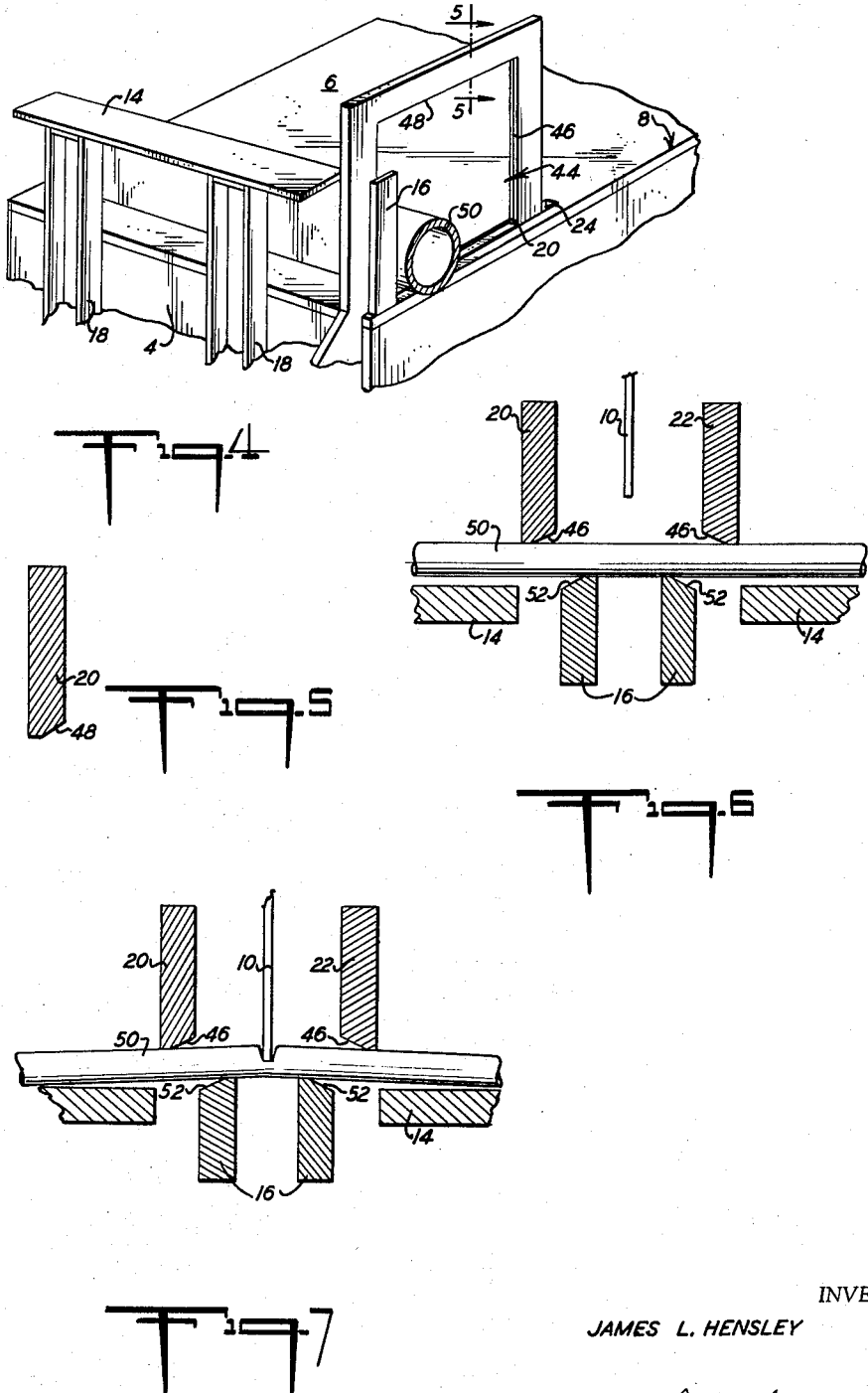
INVENTOR
JAMES L. HENSLEY
BY
Swecker + Mathis
ATTORNEYS

United States Patent Office 2,925,005
Patented Feb. 16, 1960

2,925,005
WORK HOLDER

James L. Hensley, Clinton, Tenn., assignor to Ty-Sa-Man Machine Company, Knoxville, Tenn., a corporation of Tennessee Application January 10, 1958, Serial No. 708,303

7 Claims. (Cl. 83—176)

This invention relates to a work holder, and more particularly to means for clamping workpieces in position to be acted upon by a tool. Although the present invention may be used in connection with tools of various types, it will be convenient to refer specifically to its use in clamping metal workpieces on the bed of a cut off tool, such as a diamond saw, or a friction saw.

Metal cutting machines of this character are often large, expensive pieces of equipment. In order to meet the demands of quantity production, it is essential that these machines operate rapidly to accomplish the necessary cutting of the work and that they be sufficiently durable to eliminate costly shutdowns for maintenance purposes. These factors have led to more and more expensive equipment.

In view of the expensive nature of the machines themselves, many users of the machines find it necessary economically to utilize the machines for the cutting of various kinds of workpieces. At one time, a given machine may be used to cut round stock. At another time it may be used to cut other shapes, such as I-beams angles, etc. Since all of these shapes must be held securely in position on the machine during the cutting operation, it will be evident that the work holders employed must have a high degree of versatility insofar as their applicability to diversely shaped workpieces is concerned.

In practice, however, this requirement has not been met effectively. Sometimes cut off tools are provided with work holding fixtures which may be used for the clamping of a particular type of stock. For example, there are various work holders in use at the present time which are adapted to accommodate different sizes of round stock. Other types of holders have been devised for the clamping of angles, and still others have been devised for the clamping of other shapes.

These prior fixtures may be helpful in some setups, where a given machine is to be devoted exclusively to the cutting of a single shape. However, this lack of flexibility frequently is the source of much annoyance to the operators of the machines and results in substantial amounts of lost production time. When a machine having such a fixture must be adapted to cut another type of stock, it is necessary to move the regular fixture out of the way and to clamp the new stock onto the bed of the machine by a series of simple clamping devices, such as C-clamps.

In some instances, the work holding fixtures already on the machine make this a very difficult operation. As a result, some manufacturers of cut off machines entirely omit the provision of work holding fixtures on the machines themselves. The users of such machines rely entirely upon the use of detachable clamping tools for holding the work in place. However, this practice also has its disadvantages. For every cutting operation, the operator of the machine must find a suitable clamping device among the various clamps he has on hand, and must then apply the selected clamp to the work. Considerable production time is lost in carrying out these operations.

Another limitation of the work holders now in general use is that they do not provide means for opening a cut being made in the work. In cutting some materials, there is a tendency for the cutting wheel to bind in the cut, and it is very important to hold the work in such a way that the cut will open as the cutting wheel is fed through the work to relieve the side pressure on the wheel.

It is an object of this invention to overcome the objections and disadvantages noted above and to provide an effective work holder which will minimize delays in setting up a tool.

A more specific object of this invention is to provide an improved work holder which will operate effectively to clamp diversely shaped workpieces in position to be acted upon by a tool.

Another object of this invention is to provide a work holder mounted upon a machine tool in such a way that it may be swung entirely away from the bed of the tool when desired.

Yet another object of this invention is to provide an improved work holder which can be used in connection with the cutting of work to open the cut as a cutter moves through the work.

The foregoing objects are accomplished, according to one embodiment of the invention, by the provision of a pair of movable clamping members in position to cooperate with a fixed abutment adjacent one end of the bed of the machine. The bed of the machine may include an elongated slot for receiving a cutting wheel, and the fixed abutment preferably includes a pair of vertical stops on opposite sides of the slot and a pair of vertical abutment members spaced on opposite sides of the stops.

The two clamping members are mounted for movement along slots in the bed of the machine located between the stops and the adjacent abutment members. Each of the clamping members has an enlarged opening therein for receiving the work, and means are provided for moving each of the clamping members along a path such that one or more walls of its enlarged opening will be caused to bear against the work and clamp it in place on the bed of the machine.

It is preferred that the enlarged opening in each of the clamping members include a vertically extending wall facing the bed of the machine. Also, it is preferred that the clamping members be movable bodily along paths which extend at an angle of approximately forty-five degrees with respect to the horizontal. When these relationships exist, the clamping members may be actuated to grip and hold workpieces of various cross sectional shapes without requiring complex adjustments.

In addition to the bodily movements referred to above, the clamping members also are capable of pivotal movements about a horizontal axis so that they may be swung away from the bed of the machine when desired. This feature of the invention permits the clamping members to be rendered inoperative when they are not required. When in their inactive positions, the clamping members offer no obstructions which might interfere with the positioning of workpieces upon the bed of the machine.

Another feature of the invention is that the active, work-engaging, faces of the stops forming parts of the stationary abutment and the active faces of the clamping members may be tapered so that the parts cooperate to open a cut being formed in the work by a cutting wheel moving between the two stops of the fixed abutment. As the cut is opened, the side pressure on the cutting device is relieved, and the efficiency of the cutting operation is enhanced materially.

A better understanding of the construction and operation of the invention will be gained from a consideration of the following detailed description of the embodiment illustrated in the accompanying drawings, in which:

Fig. 1 is a somewhat diagrammatic perspective view of a cut off tool embodying the work holder of the present invention;

Fig. 2 is a vertical cross sectional view of the end portion of the machine of Fig. 1, showing the parts of the work holder in various positions which they may assume under different conditions;

Fig. 3 is a transverse vertical cross sectional view taken along the line 3—3 in Fig. 2;

Fig. 4 is a somewhat diagrammatic perspective view of the end portion of a cutoff tool such as that shown in Fig. 1, the view being taken along the cutter slot of the machine;

Fig. 5 is a detail vertical cross section taken along the line 5—5 in Fig. 4;

Fig. 6 is a diagrammatic horizontal cross sectional view illustrating the active surfaces of the work holder of this invention in clamping position with respect to a cylindrical workpiece;

Fig. 7 is a view similar to Fig. 6, but illustrating the cut-opening function of the work holder; and Fig. 8 is a view similar to a portion of Fig. 2, but illustrating the application of the present invention in the clamping of another type of work.

In Fig. 1 there is diagrammatically illustrated a cut off machine 2 which comprises a frame 4 of conventional construction. The frame 4 provides a rigid base for the machine and serves to support a horizontal bed 6. As illustrated, the bed 6 is a plate, but it may be of any desired configuration. For example, I-beams, sometimes are employed in constructing the beds of machines of this type. When so used, the I-beams are fixed to the supporting frame of the machine so as to dispose their webs in vertical planes and so as to dispose their upper surfaces in a common plane. Still other structural shapes may be employed in the construction of the bed 6 of the machine 2. Insofar as the present invention is concerned, it is essential only that the bed 6 of the machine 2 provide a horizontal work supporting surface.

A slot 8 extends along the central portion of the bed 6 of the machine 2, and forms a passageway through which a rotating cutting wheel 10 may move longitudinally of the machine 2. The cutter 10 may be a diamond saw, a friction disk, or any other suitable cutting tool. It may be mounted and driven by means which are conventional in the art, and it may be provided with a suitable guard 12, if desired.

Adjacent one end of the frame 4, there is provided a vertically extending abutment fixed with respect to the bed 6 of the machine and cooperating therewith to position a workpiece to be cut by the wheel 10 as the wheel is moved longitudinally of the machine. In the drawings, this abutment is illustrated as a pair of angular members 14 rigidly secured to the frame 4 by suitable brackets 18, and a pair of vertical stops 16 fixed rigidly to the bed 6 on opposite sides of the cutter slot 8.

The adjacent end portions of the angular members 14 are spaced from the stops 16 to permit the passage therebetween of two clamping members 20 and 22 of identical configuration. As best illustrated in Fig. 3, each of the clamping members 20 and 22 is disposed within a vertically extending guide opening, formed by a slot 24 in the bed 6 and a connecting channel in the frame 4 of the machine. The two slots 24 are located on opposite sides of the stops 16 so that each clamping member may pass between a stop 16 and an adjacent angular member 14.

The lower end of each of the guide openings is closed by an inclined guide member 26, which, as indicated in Fig. 2, may extend at approximately forty-five degrees with respect to the horizontal. Rigid supports 28, forming a part of the frame 4 of the machine, are connected to the guide members 26 and serve to hold them in the desired positions.

Each of the clamping members 20 and 22 includes an inclined lower edge 30 which abuts against a guide member 26 when the clamping member is in operative position with respect to the bed 6 of the machine. When in such positions, the clamping members 20 and 22 are slidable along the guide members 26 in such a manner as to move either upwardly and forwardly, or downwardly and rearwardly.

These movements of the clamping members 20 and 22 are controlled by means of a screw threaded shaft 32 mounted for rotation in a bearing block 34 carried by a rigid bracket 36 protruding from the end of the frame 4 of the machine. A handle 38 preferably is connected to the outer end of the shaft 32 to facilitate manipulation thereof. A screw threaded block or nut 40 is mounted upon the inner end portion of the shaft 32 and is connected by pivots 42 with the clamping members 20 and 22.

Since the clamping members 20 and 22 are constrained by the walls of the slots 24 to movements in vertical planes, the pivots 42 must at all times remain horizontal. Therefore, the nut 40 is fixed against rotation with the shaft 32, and it must move axially along the shaft 32 when the shaft is rotated. As illustrated in Fig. 2, the axis of the shaft 32 is substantially parallel to the guide members 26, so that the pivots 42 move parallel to the guide members 26 as the nut 40 is shifted axially along the threaded shaft 32.

Although the threaded shaft 32 provides a simple and effective means for driving the clamping members 20 and 22, it will be apparent that other drive means may be used if desired. For example, the shaft 32 might be replaced by a piston rod suitably connected to an air cylinder or to a hydraulic cylinder.

The upper end portions of the clamping members 20 and 22 are provided with enlarged openings 44 for receiving the workpieces to be clamped. Although the openings 44 may have various shapes, it is preferred that they include a vertically extending surface 46 facing the abutment formed by the members 14 and 16, and a horizontally extending surface 48 facing the bed 6 of the machine. These criteria may be met conveniently without undue strength concessions by making the openings 44 square or rectangular in shape.

In utilizing the work holder of this invention, the material to be cut is inserted into the aligned openings 44 in the two clamping members 20 and 22, as suggested in Fig. 4, and then the handle 38 is rotated to move the clamping members 20 and 22 outwardly and downwardly along the guides 26 far enough to bring one or both of the surfaces 46 and 48 of the openings 44 into engagement with the material to be cut. In Figs. 4, 6, and 7, the work has been illustrated as a pipe 50, to suggest one of many shapes to which the work holder of the present invention may be applied.

Referring particularly to Figs. 6 and 7, it will be observed that the front faces 52 of the vertical stops 16 include two portions. The adjacent portions of the front surfaces 52 of the stops 16, i.e. those portions which are closest to the cutter slot 8 of the machine, extend transversely of the machine and are located a short distance in front of the plane of the front surfaces of the angular abutment members 14. However, the remaining portions of the surfaces 52 of the stops 16 are tapered outwardly and rearwardly away from the path of the wheel 10. In other words, the tapered portions of the surfaces 52 are divergent in a rearwardly direction.

A somewhat similar relationship exists between the active vertical faces 46 of the two clamping members 20 and 22. These also include transversely extending portions and tapered portions. However, in this case, the adjacent portions of the two faces 46 of the members 20 and 22 are the ones which diverge in a rearwardly direction, and the remote portions of the surfaces 46 are the transversely extending surfaces.

The significance of the relationships just described can best be appreciated by comparing Figs. 6 and 7. In Fig. 6, it will be noted that the cutting wheel 10 has not yet contacted the workpiece 50. However, in Fig. 7, the cutter 10 has moved part of the way through the work 50, and it will be observed that the work 50 has been bent slightly to open the cut produced by the wheel 10. This bending of the work 50 is made possible by the tapered portions of the active faces 46 and 52 and by the disposition of the angular abutment members 14 a short distance behind the forwardmost portions of the faces 52 of the stops 16.

This feature of the invention materially facilitates the cutting of the work. As the wheel 10 moves through the work, the cut is opened by the bending of the work, and the side pressure on the cutting wheel 10 is relieved to a substantial degree. It will be evident, of course, that the attainment of this desirable result is not dependent upon the particular dimensions illustrated in the drawings. Figs. 6 and 7 are intended primarily to illustrate the operative principles involved rather than actual dimensions.

Fig. 5 suggests that a similar action may be obtained when the horizontally extending surfaces 48 of the clamping members 20 and 22 are active in clamping the work. The surfaces 48 may be identical to the surfaces 46. Moreover, the cut-opening effect may be further accentuated by elevating slightly those portions of the bed 6 of the machine which extend between the slots 24 and the cutter slot 8, and by making the upper faces of such portion conform in shape to the active faces 52 of the stops 16.

It has been suggested heretofore that the work holder of this invention is applicable to workpieces of various shapes. It also may be used to clamp simultaneously a plurality of workpieces which are to be cut upon one stroke of the cutting wheel 10. A reference to Fig. 2 may be particularly helpful in understanding this feature of the invention. In this view, the work to be cut is a plurality of small round bars 54, and three positions of the clamping member 22 have been shown.

The first, or uppermost, of these positions is illustrated in dot-dash lines. It is a raised position in which a large portion of the opening 44 is exposed to permit the insertion of the work. The full line positions of the parts illustrate the clamping positions thereof, and the dot-dash lines at the left of Fig. 2 illustrate an inactive position of the clamping member 22.

The bars 54 may be placed within the openings 44 in the clamping members 20 and 22 without first establishing any predetermined relationship between the several bars 54. Then, as the clamping members 20 and 22 are moved downwardly and rearwardly from the first dot-dash line position to the full line position illustrated in Fig. 2, the several rods 54 will be wedged into a compact mass of square shape.

After the rods 54 are clamped in position, the cutting wheel 10 may be actuated so as to pass longitudinally between the two stops 16 to cut all of the rods 54 in one pass. After a rod 54 has been cut, the two sections thereof will remain in position with respect to the machine 2 by virtue of the fact that each such section will be clamped securely by one of the clamping members 20 or 22. Hence, there is no danger of injury to the cutting wheel 10 due to uncontrolled relative movements between the work and the wheel immediately after the cutting operation.

When the cutting wheel 10 has been returned longitudinally of the machine to the position it occupies in Fig. 1, the handle 38 may be rotated in the opposite direction to return the clamping members 20 and 22 upwardly and forwardly to their original positions. During this movement, the clamping forces upon the rods 54 are released, and then the rods may be withdrawn from the machine. Other workpieces then may be inserted into the openings 44.

It will be seen that in handling the pipe 50 and the rods 54, there are four groups of active clamping surfaces. These are portions of the upper surface of the bed 6 of the machine, the forward vertical surfaces of the abutment formed by the stops 16 and the members 14, the vertically extending surfaces 46 of the openings 44, and the horizontally extending surfaces 48 of the openings 44. However, it is not essential for effective clamping that all of these surfaces be active at one time.

As illustrated in Fig. 8, for example, the work holder of this invention may accommodate shapes which contact only one of the surfaces 46 and 48 of each of the openings 44 in the clamping members 20 and 22. The workpiece 56 illustrated in this view is an angle iron, one leg of which is substantially shorter than the other. In handling such a workpiece, only one of the surfaces 46 and 48 of the openings 44 will contact the workpiece. In these instances, it is preferred that the workpiece be placed upon the bed 6 so that it will be contacted by the vertically extending surfaces 46 of the clamping members 20 and 22, but the workpiece may, if desired, be contacted by the horizontally extending surfaces 48 of the clamping members.

When the workpiece 56 is engaged by the vertical surface 46 of each of the clamping members 20 and 22, it may be wedged into clamping engagement between such surface and the vertical abutment formed by the angular members 14 and the stops 16 of the end of the frame 4 of the machine. The holding power of the clamping action established in this manner is comparable to that provided by the clamps now in use in the trade, and it has been found to be satisfactory in practice.

Similarly, some workpieces may be so shaped that they will be contacted by the horizontally extending surfaces 48 of the openings 44 in the clamping members 20 and 22, and will not be contacted by the vertical surfaces 46. In these instances, an effective clamping action can be set up between the horizontally extending surfaces 48 of the clamping members 20 and 22, and the upper surface of the bed 6 of the machine 2.

One other desirable characteristic of the present invention is suggested in Figs. 1 and 2. It will be noted that in Fig. 1, the clamping member 20 has been swung rearwardly about its pivot 42. A similar position is shown in dot-dash lines, at the left in Fig. 2, but in this instance the pivot 42 is shifted rearwardly a substantial distance along the screw 32. When both of the clamping members 20 and 22 are moved rearwardly about their pivots 42, they offer no obstruction to the positioning of workpieces at the juncture of the bed 6 of the machine and the abutment formed by the angular members 14 and the stops 16. It is contemplated in this connection that when very large workpieces are to be handled, the clamping members 20 and 22 may be rendered inoperative, and other means, such as conventional C-clamps, or the like, may be employed in holding the work during cutting. The novel mounting means for the clamping members 20 and 22 greatly facilitates this type of adjustment and enhances the overall flexibility of the equipment.

However, it should be understood that this feature need not be incorporated in all embodiments of the invention. In adapting the work holder for use on some machines, it is anticipated that it will not be necessary or desirable to make provisions for swinging the clamping members 20 and 22 out of their operative positions. In such instances, the pivots 42 will not be required and the clamping members 20 and 22 may be connected directly with the means for moving them.

Although the invention has been illustrated as being applied to a cut off machine, it will be evident that its utility is not restricted thereto. It may be applied to advantage in various machine tools, such as drilling machines, shaping machines, etc., or it may be embodied in a portable clamp structure, such as a pipe vise.

Moreover, various modifications and alterations of the construction of the work holder will be apparent to persons skilled in the art. Therefore, the foregoing detailed description of the illustrated embodiment of the invention is to be considered as exemplary only, and the scope of the invention is to be ascertained from the following claims.

I claim:

1. A work holder comprising a frame, a pair of stationary work supports on said frame spaced from each other sufficiently to permit the passage of a cutting device therebetween and each having a horizontally extending surface and a vertically extending surface, the adjacent portions of the vertically extending surfaces of said supports being disposed in alignment with each other and the remote portions of the vertically extending surfaces of said supports being tapered so as to diverge rearwardly, a pair of clamping members each having a work-receiving opening therein the walls of which include a rearwardly facing vertically extending surface, means mounting said clamping members on said frame for movement along paths such that said vertically extending surfaces of said members may be moved toward said vertically extending faces of said supports, the remote portions of said vertically extending surfaces of said members being disposed in alignment with each other and the adjacent portions thereof being tapered so as to diverge rearwardly, and means for moving said clamping members along said paths to clamp a workpiece between said supports and said members and apply twisting forces to the workpiece tending to open a cut being made by a cutting device inserted into the space between said supports.

2. A work holder comprising a frame, a pair of stationary work supports on said frame spaced from each other sufficiently to permit the passage of a cutting device therebetween and each having a horizontally extending surface and a vertically extending surface, the vertically extending surface of each of said supports being tapered so that said surfaces diverge rearwardly, a pair of vertical clamping members mounted on said frame on opposite sides of said supports for movement along paths inclined with respect to both the vertical and the horizontal, each of said clamping members having a work-receiving opening therein the walls of which include a downwardly facing horizontally extending surface portion and a rearwardly facing vertically extending surface portion, said horizontally extending surface portions being tapered so that they diverge downwardly, said vertically extending surface portions being tapered so that they diverge rearwardly, and means for moving said clamping members along said paths to clamp a workpiece between said surfaces of said supports and said surface portions of the walls of the openings in said clamping members, whereby, said surfaces and surface portions cooperate to impose bending forces upon the workpiece tending to open a cut being made by a cutting device inserted into the space between said supports.

3. In a tool having a frame provided with a bed for receiving the work to be operated upon, the improvement which comprises an abutment fixed to said frame and including an exposed surface extending approximately at right angles to the work-supporting surface of said bed, said bed having an elongated gap therein extending perpendicular to said abutment, said abutment having a gap therein communicating with said gap in said bed, a clamping member having a work-receiving aperture therein the walls of which include surface portions parallel to and facing said surfaces of said bed and said abutment, means mounting said clamping member on said frame in said gaps for movement back and forth along a path inclined with respect to both the exposed surface of said abutment and the work-supporting surface of said bed, and means connected to said clamping member for moving it along said path in a direction such as to move said surface portions of the walls of said opening toward said surfaces of said bed and said abutment.

4. In a tool having a frame provided with a bed for receiving the work to be operated upon, the improvement which comprises an abutment fixed to said frame and including an exposed surface extending approximately at right angles to the work-supporting surface of said bed, a plurality of clamping members spaced apart along the length of said abutment and having identical, rectangular, work-receiving openings therein aligned in the direction of the length of said abutment, means mounting each of said clamping members on said frame with one wall surface of the opening therein facing said surface of said bed and with another wall surface of the opening therein facing said surface of said abutment, and means for simultaneously moving all of said clamping members relative to said abutment and said bed in such a direction as to move said wall surfaces of said openings in said clamping members toward said surfaces of said bed and said abutment.

5. In a tool having a frame provided with a bed for receiving the work to be operated upon, the improvement which comprises an abutment fixed to said frame and including an exposed surface extending approximately at right angles to the work-supporting surface of said bed, a guide fixed to said frame and extending at an angle of about forty-five degrees with respect to both the work-supporting surface of the bed and the exposed surface of the abutment, a screw threaded rod rotatably mounted on said frame and extending parallel to said guide, a block having a threaded opening therethrough cooperating with said threaded rod so that rotation of said rod causes said block to move axially of said rod, and a clamping member pivotally connected to said block and including a portion which may bear against said guide, said clamping member being provided with a rectangular work-receiving opening therein so oriented that, when said portion of the clamping member bears against said guide, one wall surface of the opening faces said surface of the bed and another wall surface of the opening faces said surface of the abutment.

6. In a cut off tool having a frame provided with a horizontal bed for receiving the work to be cut, and a cutter movable longitudinally of the bed for cutting the work, the improvement which comprises a transverse abutment fixed to said frame adjacent an end of said bed, said abutment having a gap therein to permit passage of said cutter and having a vertical work-engaging face extending upwardly from said bed, guide means fixed to said frame beneath said bed and including guide surfaces on opposite sides of the path of movement of said cutter and extending parallel to said path, said guide surfaces extending downwardly and outwardly toward said end of the bed at an angle of about forty-five degrees to the horizontal, a screw threaded rod extending parallel to said guide surfaces and being rotatably mounted on said frame at a location spaced outwardly from said end of the bed, a block having a threaded opening therein cooperating with said rod to cause axial movements of said block upon rotation of said rod, and a pair of vertical clamping members pivotally connected to opposite sides of said block and including portions which may bear against said guide surfaces, said clamping members being provided with identical, rectangular, work-receiving openings therein aligned in the direction of the length of said abutment and so oriented that, when said portions of said clamping members bear against said guide surfaces, one wall surface of the opening in each clamping member faces the upper surface of the bed and another wall surface of the opening in each clamping member faces said vertical face of said abutment.

7. In a cut off tool having a frame, a horizontal bed fixed to the frame for receiving the work to be cut and having a longitudinal cutter slot therein, and a cutter movable longitudinally of the bed through the slot for cutting the work, the improvement which comprises a pair of aligned stops rigid with said bed and projecting upwardly therefrom on opposite sides of said cutter slot near one end of the bed, each of said stops having a vertical work-contacting wall which tapers outwardly from the path of movement of the cutter, said bed being provided with a pair of slots extending parallel to said cutter slot on opposite sides of said stops, rigid abutment members fixed with respect to said bed on opposite sides of said pair of slots and including vertical work-contacting faces disposed closer to said end of the bed than the leading edges of said work-contacting walls of said stops, guide means fixed to said frame beneath said bed and including guide surfaces disposed beneath said pair of slots, said guide surfaces extending downwardly and outwardly toward said end of the bed at an angle of about forty-five degrees to the horizontal, a pair of clamping members disposed in said pair of slots for sliding movement along said guide surfaces, each of said clamping members having a work-receiving opening therein the walls of which include surface portions facing said bed and said stops, the surface portion of each of said openings facing said stops being tapered toward said cutter slot so as to extend substantially parallel to the tapered wall of the adjacent stop, and means for moving said clamping members along said guide surfaces.

References Cited in the file of this patent
UNITED STATES PATENTS

| | | |
|---|---|---|
| 468,272 | Watt | Feb. 2, 1892 |
| 524,282 | McTighe | Aug. 7, 1894 |
| 2,354,509 | Dreher | July 25, 1944 |
| 2,585,594 | Snyder | Feb. 12, 1952 |
| 2,747,255 | Millington | May 29, 1956 |
| 2,759,385 | Franck | Aug. 21, 1956 |
| 2,769,224 | Hake | Nov. 6, 1956 |
| 2,772,528 | Else | Dec. 4, 1956 |

FOREIGN PATENTS

| | | |
|---|---|---|
| 581,887 | Germany | Aug. 4, 1933 |